(12) United States Patent
Husemann et al.

(10) Patent No.: US 7,144,928 B2
(45) Date of Patent: *Dec. 5, 2006

(54) UV-TRANSPARENT PRESSURE SENSITIVE ADHESIVE

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 175 days.

This patent is subject to a terminal disclaimer.

(21) Appl. No.: 10/745,305

(22) Filed: Dec. 22, 2003

(65) Prior Publication Data

US 2004/0254289 A1   Dec. 16, 2004

(30) Foreign Application Priority Data

May 21, 2003   (DE)  ................................ 103 22 899

(51) Int. Cl.
*C09J 7/02*  (2006.01)
*C09J 133/08*  (2006.01)

(52) U.S. Cl. .................. 522/35; 526/222; 526/224; 526/319; 526/905; 525/309; 430/270.1; 428/346; 428/355; 428/355 N; 428/356

(58) Field of Classification Search ................ 428/346, 428/355 N, 355, 356; 430/270.1; 526/319, 526/905, 222, 224; 525/309; 522/35
See application file for complete search history.

(56) References Cited

U.S. PATENT DOCUMENTS 5,776,651 A    7/1998  Lu et al.
6,132,844 A    10/2000 Altshuler et al.
6,720,399 B1 *  4/2004 Husemann et al. ......... 526/319
6,958,186 B1 * 10/2005 Husemann et al. ......... 428/346
2003/0201036 A1  10/2003 Hashimura et al.

FOREIGN PATENT DOCUMENTS

| EP | 0 736 585 | 10/1996 |
|---|---|---|
| EP | 0 788 029 | 8/1997 |
| EP | 1 037 953 | 9/2000 |
| EP | 1 347 069 | 9/2003 |

\* cited by examiner

*Primary Examiner*—Kelechi C. Egwim
(74) *Attorney, Agent, or Firm*—Norris McLaughlin & Marcus PA

(57) ABSTRACT

A UV-transparent pressure sensitive adhesive comprising
(a) a copolymer of
  (a1) from 75 to 99.8% by weight of acrylic esters and/or methacrylic esters of the formula $CH_2=CH(R_1)(COOR_2)$, where $R_1$ is H or $CH_3$ and $R_2$ is an alkyl chain having 1 to 20 carbon atoms;
  (a2) from 0 to 10% by weight of acrylic acid and/or methacrylic acid of the formula $CH_2=CH(R_1)(COOH)$, where $R_1$ is H or $CH_3$;
  (a3) from 0.2 to 5% by weight of olefinically unsaturated monomers which contain at least one UV-crosslinking functional group per monomer; and
  (a4) from 0 to 20% by weight of olefinically unsaturated monomers which contain at least one functional group per monomer; the copolymer having a weight average molecular weight of less than 300,000 g/mol and
(b) from 2 to 20% by weight, based on the weight of copolymer, of a silicate filler, the silicate filler having a maximum particle diameter of 50 nm;
and having a residual solvent fraction of less than 1%, based on the pressure sensitive adhesive.

7 Claims, No Drawings

UV-TRANSPARENT PRESSURE SENSITIVE ADHESIVE

The invention relates to a UV-transparent pressure sensitive adhesive, a process for preparing it and the use thereof as pressure sensitive adhesive for an adhesive tape.

BACKGROUND OF THE INVENTION

Pressure sensitive adhesives (PSAs) are used in many cases for long-term bonds even in a relatively large temperature range. For these applications acrylic PSAs are used with great preference. Besides their very good temperature stability these acrylic PSAs also possess further advantages, such as very low aging and also weathering under UV light and an oxygen-containing atmosphere, for example.

A further very important aspect is the optical transparency of the PSAs. Specifically a multiplicity of industrial applications in the electrical and electronics sector call for acrylic PSAs which still possess a high transparency even at a wavelength of 400 nm.

A further trend lies in the use of PSA tapes with very low solvent fractions. A suitable technology here is that known as the hotmelt technology, in which polyacrylate PSAs are freed from their solvent and subsequently coated from the melt. The coating operation is relatively trouble-free for acrylic hotmelt PSAs with low average molecular weight, as evidenced by the commercial acrylic hotmelt PSAs UV acResins™ from BASF AG. For a multiplicity of industrial applications, however, a high shear strength (high internal cohesion) is called for, which these hotmelt PSAs, however, are unable to fulfill.

It is an object of the invention, therefore, to specify a process for preparing a UV-crosslinking pressure sensitive adhesive which is to be processed from the melt, has a high UV transparency, possesses a low residual solvent fraction, and has a high internal cohesion after UV crosslinking. Furthermore, it is intended to specify a process for preparing a pressure sensitive adhesive of this type and also the use thereof as a pressure sensitive adhesive for an adhesive tape.

SUMMARY OF THE INVENTION

This object is achieved by means of a UV-transparent pressure sensitive adhesive which has a UV transparency at 300 nm of more than 95%, comprising:

(a) a copolymer of
  (a1) from 75 to 99.8% by weight of acrylic esters and/or methacrylic esters of the formula $CH_2=CH(R_1)(COOR_2)$, where $R_1$ is H or $CH_3$ and $R_2$ is an alkyl chain having 1 to 20 carbon atoms;
  (a2) from 0 to 10% by weight of acrylic acid and/or methacrylic acid of the formula $CH_2=CH(R_1)(COOH)$, where $R_1$ is H or $CH_3$;
  (a3) from 0.2 to 5% by weight of olefinically unsaturated monomers which contain at least one UV-crosslinking functional group per monomer; and
  (a4) from 0 to 20% by weight of olefinically unsaturated monomers which are different than the olefinically unsaturated monomers of (a3) and which contain at least one functional group per monomer;
  said copolymer having a weight average molecular weight $M_w$ of less than 300,000 g/mol, and
(b) from 2 to 20% by weight, based on the copolymer composition, of a silicate filler, the silicate filler having a maximum particle diameter of 50 nm;
the residual solvent fraction being less than 1%, based on the pressure sensitive adhesive.

This PSA is thus a UV-transparent and UV-crosslinking acrylic PSA.

DETAILED DESCRIPTION

The average molecular weight $M_w$ is determined in accordance with test A, the residual solvent fraction in accordance with test B. Both tests are elucidated further in connection with the examples.

One preferred PSA comprises a copolymer composition with from 86 to 90% by weight of component (a1). A further preferred PSA comprises a copolymer composition with from 4 to 6% by weight of component (a2). Another preferred PSA comprises a copolymer composition with from 0.5 to 1.5% by weight of component (a3).

Accordingly, particular preference is given to a pressure sensitive adhesive which comprises a copolymer composition with from 86 to 90% by weight of component (a1), from 4 to 6% by weight of component (a2), from 0.5 to 1.5% by weight of component (a3), and from 0 to 20% by weight of component (a4).

The residual solvent fraction is preferably below 0.5%, based on the PSA.

The PSA includes preferably from 5 to 10% by weight of the silicate filler, based on the copolymer composition. In one preferred embodiment of the invention the silicate fillers, or further filler particles, have a size of not more than 10 to 30 nm.

Besides conventional and commercially available silica gel, such as Degussa Aerosil 200™, for example, it is also possible to use synthetically layered silicates, such as SOMASIF™ ME 100 from CO-OP Ltd., Japan, as silicate filler. It is additionally possible to use nanospherical silica gels, which can be prepared, for example, by procedures of Philipse [Journal Colloid Interface Science 1989, 128, 121–136] or Buining [Journal Colloid Interface Science 1996, 179, 318–321]. Nanospherical silica gels are, however, also available commercially from DuPont under the brand names Ludox® and Synton™ with particle sizes from 5 to 40 nm. The particle size of the silica gel should be not more than 50 nm, and in this context the desired range should then be adjusted, for example, by milling with a bore mill.

The monomers are preferably chosen such that the resulting polymers can be used at room temperature as pressure sensitive adhesives, especially such that the resulting polymers possess PSA properties in accordance with the "Handbook of Pressure Sensitive Adhesive Technology" by Donatas Satas (van Nostrand, New York 1989) and as low as possible a level of UV absorption in the UV light range below 400 nm. Consequently, for example, for a1), a2), and a4), monomers containing aromatics are omitted.

In order to achieve a preferred glass transition temperature, $T_g$, of the polymers, of $T_g \leq 25°$ C., which is preferred for pressure sensitive adhesives, the monomers are very preferably selected, and the quantitative composition of the monomer mixture is advantageously chosen, in accordance with the remarks above, in such a way as to give the desired $T_g$ for the polymer in accordance with the Fox equation (I) (cf. T. G. Fox, Bull. Am. Phys. Soc. 1 (1956) 123).

$$\frac{1}{T_g} = \sum_n \frac{w_n}{T_{g,n}} \quad (1)$$

In this formula, n represents the summation value of the monomers used, $w_n$ the mass fraction of the respective monomer n (% by weight), and $T_{g,n}$ the respective glass transition temperature of the homopolymer of the respective monomer n, in K.

In one very preferred way the monomers used for a1) are acrylic or methacrylic monomers which are composed of acrylic and methacrylic esters having alkyl groups of 4 to 14 carbon atoms, preferably 4 to 9 carbon atoms. Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as isobutyl acrylate, 2-ethylhexyl acrylate, 2-ethylhexyl methacrylate, isooctyl acrylate, and isooctyl methacrylate, for example.

Further classes of compounds to be used for a1) are monofunctional acrylates and/or methacrylates of bridged cycloalkyl alcohols, composed of at least 6 carbon atoms. The cycloalkyl alcohols may also be substituted, by $C_{1-6}$ alkyl groups, halogen atoms or cyano groups, for example. Specific examples are cyclohexyl methacrylates, isobornyl acrylate, isobornyl methacrylates, and 3,5-dimethyladamantyl acrylate.

In one embodiment the monomers used for a4) are those which carry polar groups such as carboxyl radicals, sulfonic and phosphonic acid, hydroxyl radicals, lactam and lactone, N-substituted amide, N-substituted amine, carbamate, epoxy, thiol, alkoxy or cyan radicals, ethers or the like.

Moderate basic monomers for a4) are, for example, N,N-dialkyl-substituted amides, such as N,N-dimethylacrylamide, N,N-dimethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxymethyl)acrylamide, N-isopropylacrylamide, this list not being conclusive.

Further preferred examples of a4) are hydroxyethyl acrylate, hydroxypropyl acrylate, hydroxyethyl methacrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl methacrylate, 2-butoxyethyl acrylate, cyanoethyl methacrylate, cyanoethyl acrylate, glyceryl methacrylate, 6-hydroxyhexyl methacrylate, vinylacetic acid, tetrahydrofurfuryl acrylate, β-acryloyloxypropionic acid, trichloroacrylic acid, fumaric acid, crotonic acid, aconitic acid, dimethylacrylic acid, this list not being conclusive.

In another very preferred procedure the monomers a4) used are vinyl esters, vinyl ethers, vinyl halides, vinylidene halides, vinyl compounds with aromatic rings and heterocycles in α-position. Here again mention may be made nonexclusively of some examples: vinyl acetate, vinylformamide, vinylpyridine, ethyl vinyl ether, vinyl chloride, vinylidene chloride, and acrylonitrile.

Furthermore in a further embodiment, for a3), photoinitiators having a copolymerizable double bond are used. Suitable photoinitiators are Norrish I and Norrish II photoinitiators. Examples are benzoin acrylate and an acrylated benzophenone from UCB (Ebecryl P 36®). In principle it is possible to copolymerize any photoinitiators known to the skilled worker which are able to crosslink the polymer by way of a free-radical mechanism under UV irradiation. An overview of possible photoinitiators which can be used, which can be functionalized with a double bond, is given in Fouassier: "Photoinitiation, Photopolymerization and Photocuring: Fundamentals and Applications", Hanser-Verlag, Munich 1995. For further details refer to Carroy et al. in "Chemistry and Technology of UV and EB Formulation for Coatings, Inks and Paints", Oldring (ed.), 1994, SITA, London.

In one embodiment, resins can be admixed to the PSAs. As tackifier resins to be added it is possible to employ only resins which have an extremely low absorption in the UV range from 300 to 400 nm.

Here again, preference is given in turn to resins which have only a very low aromatic fraction, if indeed they have any at all, or conjugated double bonds. An overview of all resins compatible with polyacrylates is given in the "Handbook of Pressure Sensitive Adhesive Technology" by Donatas Satas (van Nostrand, 1989).

A further possibility, which is optional, is to add plasticizers, nucleators, blowing agents, compounding agents and/or aging inhibitors, in the form for example of primary and secondary antioxidants or in the form of light stabilizers.

In addition it is possible to add in crosslinkers and promoters for the crosslinking. Suitable crosslinkers for electron beam crosslinking and UV crosslinking are, for example, difunctional or polyfunctional acrylates, difunctional or polyfunctional isocyanates (including those in blocked form) or difunctional or polyfunctional epoxides.

For optional crosslinking in UV light, UV-absorbing photoinitiators can be added to the PSAs of the invention. Useful photoinitiators whose use is very effective are benzoin ethers, such as benzoin methyl ether and benzoin isopropyl ether, for example; substituted acetophenones, such as 2,2-diethoxyacetophenone (available as Irgacure 651® from Ciba Geigy®), 2,2-dimethoxy-2-phenyl-1-phenylethanone, and dimethoxyhydroxyacetophenone, for example; substituted α-ketols, such as 2-methoxy-2-hydroxypropiophenone, for example; aromatic sulfonyl chlorides, such as 2-naphthylsulfonyl chloride, for example; and photoactive oximes, such as 1-phenyl-1,2-propanedione 2-(O-ethoxycarbonyl) oxime, for example.

The abovementioned photoinitiators and further photoinitiators which can be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenylmorpholine ketone, aminoketone, azobenzoin, thioxanthone, hexaarylbisimidazole, triazine or fluorenone radicals, it being possible for each of these radicals to be additionally substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. Further details can be found from Carroy et al. in "Chemistry and Technology of UV and EB Formulation for Coatings, Inks and Paints", Oldring (ed.), 1994, SITA, London.

In order to prepare the PSAs of the invention, it is advantageous to carry out conventional free-radical polymerizations. For the polymerizations which proceed by a free-radical mechanism it is preferred to use initiator systems which additionally contain further free-radical initiators for the polymerization, particularly thermally decomposing, free-radical-forming azo or peroxo initiators. Suitable in principle, however, are all customary initiators for acrylates which are familiar to the skilled worker. The production of C-centered free radicals is described in Houben Weyl, Methoden der Organischen Chemie, Vol. E 19a, pp. 60–147. These methods are preferentially applied analogously.

Examples of free-radical sources are peroxides, hydroperoxides, and azo compounds. As a few nonexclusive examples of typical free-radical initiators mention may be made here of potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred version, 1,1'-azo-bis(cyclohexanecarbonitrile) (Vazo 88™ from DuPont) or azodiisobutyronitrile (AIBN) is used as free-radical initiator.

The nanoparticulate fillers may be admixed to the monomers prior to the polymerization and/or after the end of the polymerization.

The average molecular weights $M_w$ of the PSAs formed in the course of the free-radical polymerization are very preferably chosen such as to be situated within a range of $\leq 300\,000$ g/mol; specifically for further use as hotmelt PSAs, polymers having average molecular weights $M_w$ of from 150 000 to 275 000 g/mol are prepared. The average molecular weight is determined by size exclusion chromatography (GPC) or matrix-assisted laser desorption/ionization coupled with mass spectrometry (MALDI-MS).

The polymerization may be carried out in bulk, in the presence of one or more organic solvents, in the presence of water, or in mixtures of organic solvents and water. The aim is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl acetate, propyl, butyl or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. A water-miscible or hydrophilic cosolvent may be added to the aqueous polymerization reactions in order to endure that in the course of monomer conversion the reaction mixture is in the form of a homogeneous phase. Cosolvents which can be used with advantage for the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and their salts, esters, organic sulfides, sulfoxides, sulfones, alcohol derivatives, hydroxyether derivatives, amino alcohols, ketones and the like, and also derivatives and mixtures of these.

The polymerization time is between 2 and 72 hours, depending on conversion and temperature. The higher the reaction temperature that can be chosen, i.e., the higher the thermal stability of the reaction mixture, the lower the reaction time that can be chosen.

For the initiators which undergo thermal decomposition, the introduction of heat is essential to initiate the polymerization. For the thermally decomposing initiators the polymerization can be initiated by heating at from 50 to 160° C., depending on initiator type.

For the preparation it can also be of advantage to polymerize the PSAs in bulk. For this purpose it is possible in particular to employ the prepolymerization technique. The polymerization is initiated with UV light but conducted only to a low conversion rate of about 10 to 30%. Subsequently this polymer syrup can be welded into films, for example (in the most simple case, ice cubes) and then polymerized in water to a high conversion rate. The resulting pellets can be employed as acrylic hotmelt adhesives, the film materials used for the melting operation being, with particular preference, those which are compatible with the polyacrylate. For this preparation method it is also possible to add the thermally conductive material additions before or after the polymerization.

Another advantageous preparation process for the pressure sensitive adhesives of the invention is that of anionic addition polymerization. In this case it is preferred to use inert solvents as the reaction medium, such as aliphatic and cycloaliphatic hydrocarbons, for example, or else aromatic hydrocarbons.

In this case the living polymer is generally represented by the structure $P_L(A)$—Me, in which Me is a metal from group I, such as lithium, sodium or potassium, for example, and $P_L(A)$ is a growing polymer formed from the acrylic monomers. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium or octyllithium, with this list making no claim to completeness. Furthermore, initiators based on samarium complexes are known for the polymerization of acrylates (Macromolecules, 1995, 28, 7886) and can be used here.

Moreover it is also possible to use difunctional initiators, such as 1,1,4,4-tetraphenyl-1,4-dilithiobutane or 1,1,4,4-tetraphenyl-1,4-dilithioisobutane, for example. Coinitiators may likewise be used. Suitable coinitiators include lithium halides, alkali metal alkoxides or alkylaluminum compounds. In one very preferred embodiment the ligands and coinitiators are chosen such that acrylic monomers, such as n-butyl acrylate and 2-ethylhexyl acrylate, for example, can be polymerized directly and need not be generated in the polymer by a transesterification with the corresponding alcohol.

In order to prepare pressure sensitive adhesives having a narrow molecular weight distribution, controlled free-radical polymerization methods are also suitable.

In order to produce the PSA tapes according to the invention, the PSAs can be coated from solution or, very preferably, as hotmelt systems (i.e., from the melt). For the preparation process it may therefore be necessary to remove the solvent from the PSA. In principle here it is possible to use any of the techniques known to the skilled worker. One very preferred technique is that of concentration using a single-screw or twin-screw extruder. The twin-screw extruder may be operated corotatingly or counterrotatingly. The solvent or water is distilled off preferably by way of two or more vacuum stages. Moreover, counterheating is carried out depending on the distillation temperature of the solvent. The residual solvent fractions are preferably <1%, more preferably <0.5%, and most preferably <0.2%.

For coating from the melt as a hotmelt system, in one preferred version the filling material is compounded to the melt. In this case homogeneous incorporation is vital. Homogeneous distributions of the filling material in the PSA are achieved preferably by compounding in twin-screw extruders or planetary roll extruders. The twin-screw extruders may be operated corotatingly or counterrotatingly.

An advantage of this procedure is the only very brief contamination of the production operation with the filling material, and the avoidance of solvents.

After the compounding operation, the hotmelt is coated onto a backing material, preferably by way of a melt die or by way of an extrusion die or by way of a roll applicator.

UV crosslinking is effected by irradiation with shortwave ultraviolet radiation in a wavelength range from 200 to 400 nm, depending on the UV photoinitiator used, in particular using high or medium pressure mercury lamps with an output of from 80 to 240 W/cm. The irradiation intensity is adapted to the respective quantum yield of the UV photoinitiator and to the degree of crosslinking to be brought about.

Optionally, in one embodiment, where possible, crosslinking can be carried out additionally with electron beams. Typical irradiation equipment which may be used includes linear cathode systems, scanner systems, and segmented cathode systems, where electron beam accelerators are concerned. A detailed description of the state of the art and the most important process parameters can be found in Skelhorne, Electron Beam Processing, in Chemistry and Technology of UV and EB formulation for Coatings, Inks and Paints, Vol. 1, 1991, SITA, London. The typical acceleration voltages are in the range between 50 kV and 500 kV, preferably between 80 kV and 300 kV. The scatter doses employed range between 5 to 150 kGy, in particular between 20 and 100 kGy.

It is also possible to employ both crosslinking processes, or other processes which allow high-energy irradiation.

In very preferred embodiments transfer tapes, double-sided or single-sided PSA tapes are produced. Suitable backing material for transfer tapes includes, for example, all siliconized or fluorinated films having a release effect. Examples of suitable film materials in general include BOPP, MOPP, PET, PVC, PU, PE, PE/EVA, EPDM, and PP. Furthermore, for transfer tapes it is also possible to use release papers (glassine papers, craft papers, and papers with a polyolefin coating).

EXAMPLES

The invention is illustrated below by examples, without wishing to impose any unnecessary restriction by the choice of samples analyzed. The following test methods were employed:

Gel Permeation Chromatography GPC (Test A)

The average molecular weight $M_w$ and the polydispersity PD were determined by way of gel permeation chromatography. The eluent used was THF containing 0.1% by volume trifluoroacetic acid. The measurement was made at 25° C. The precolumn used was PSS-SDV, 5μ, $10^3$ Å, ID 8.0 mm×50 mm. Separation was carried out using columns PSS-SDV, 5μ, $10^3$ and also $10^5$ and $10^6$ Å with in each case ID 8.0 mm×300 mm. The sample concentration was 4 g/l, the flow rate 1.0 ml per minute. Measurement was made against PMMA standards.

Residual Solvent (Test B)

The residual solvent fractions were determined gravimetrically. 2 g of the acrylic PSA were placed in a metal can which was stored open at 120° C. in a drying oven for fifteen minutes. Then the weight was measured again. The difference between the original weight of the PSA and the measured weight is expressed in percentage form as the residual solvent loss.

UV Transmission (Test C)

The transmission was measured in the wavelength range from 190 to 900 nm using a Uvikon 923 from Biotek Kontron on a sample film 100 μm thick applied to 50 μm polyolefin film, measurement taking place against an uncoated polyolefin film reference.

Shear Strength (Test D) (Performed According to PSTC-7. Procedure A):

After having been laminated onto aluminum foil, a 13 mm wide strip of the adhesive tape was applied to a smooth steel surface which had been cleaned three times with acetone and once with isopropanol. The area of application was 20×13 mm (length×width). Subsequently the adhesive tape was pressed onto the steel substrate four times, with application of a pressure of 2 kg. At room temperature a 1 kg weight was fastened to the adhesive tape. The shear stability times measured are expressed in minutes and correspond to the average from three measurements.

Peel Adhesion Test 180° (Test E):

A 20 mm wide strip of an acrylic PSA coated onto polyester was applied to steel plates. The acrylic PSA strip was pressed onto the substrate twice using a 2 kg weight. Immediately thereafter the adhesive tape was removed from the substrate at 300 mm/min and an angle of 180°. The steel plates had been washed twice with acetone and once with isopropanol. The results of measurement are expressed in N/cm and are averaged from three measurements. All measurements were conducted at room temperature under climatized conditions.

The text below describes the preparation of immobilized silica gel particles. These specific silica gel particles are used as reference material (w) in reference example 3.

(a) Preparation of an Azo-functionalized Silyl Compound:

The allyl ester 3 is prepared, as shown in reaction scheme (II), by the method of Prucker and Rühe from the carboxylic acid 1 via the intermediate 2 (Macromolecules 1998, 31, 602–613).

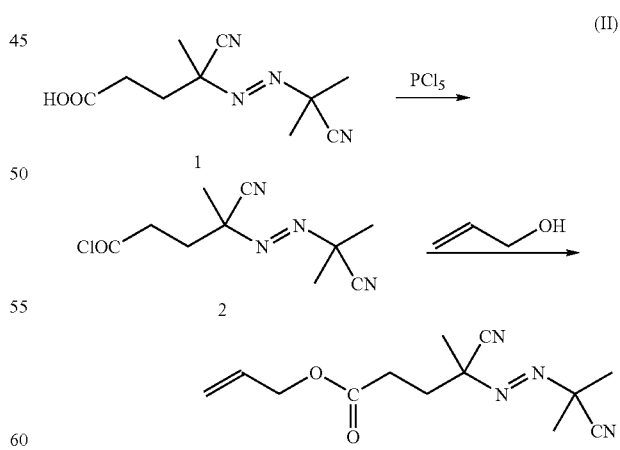

Spectrum of 3: 1H-NMR (CDCl$_3$, δ in ppm): 5.8–5.9 (m, 1H); 5.2–5.4 (m, 2H); 4.6 (d, 2H); 2.3–2.5 (m, 4H); 1.69, 1.71, 1.73 (s, 3H each signal).

Hydrosilylation of the allyl ester 3 to the chlorosilane 4 takes place, as shown in reaction scheme (III), by the method of Husemann and Hawker et al. (Macromolecules 1999, 32, 1424–1431).

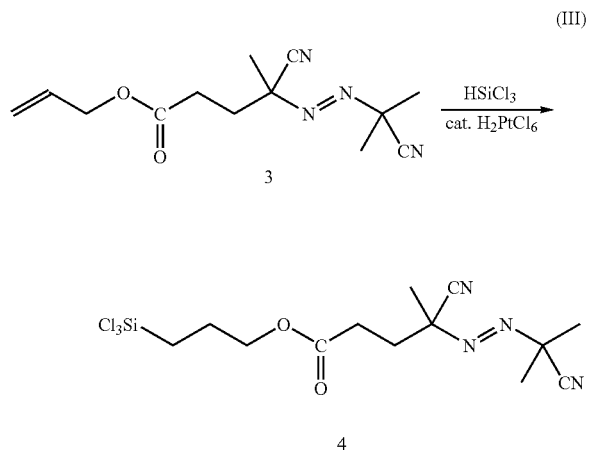

(b) Reaction of the Chlorosilane 4 to the Immobilized Silica Gel Particles (w):

The silica gel particles are reacted by the method of Husemann and Hawker et al. (Macromolecules 1999, 32, 1424–1431).

Reference Examples 1 and 3 and Examples 1 to 4

The silicate fillers used in examples 1 to 4 were purchased from DuPont.

Reference Example 1

A 2 l glass reactor conventional for free-radical polymerizations was charged with 18 g of acrylic acid, 40 g of N-tert-butylacrylamide, 340 g of 2-ethylhexyl acrylate and 2 g of acrylated benzophenone Ebecryl P36® [UCB], 16 g of isopropanol, 133 g of petroleum spirit and 133 g of acetone. After nitrogen gas had been passed through the reaction solution with stirring for 45 minutes, the reactor was heated to 58° C. and 0.4 g of 2,2'-azobis(2-methylbutyronitrile) was added. Subsequently the external heating bath was heated to 75° C. and the reaction was carried out constantly at this external temperature. After 4 h and 6 h the mixture was diluted each time with 150 g of acetone/petroleum spirit mixture and 9 g of isopropanol. After a reaction time of 24 h the polymerization was terminated and the system was cooled to room temperature.

GPC measurement (gel chromatography, test A) gave an average molecular weight $M_w$ of 280 000 g/mol.

Reference Example 2

A 2 l glass reactor conventional for free-radical polymerizations was charged with 14 g of acrylic acid, 160 g of n-butyl acrylate, 160 g of 2-ethylhexyl acrylate, 64 g of methyl acrylate and 2 g of benzoin acrylate, 16 g of isopropanol, 133 g of petroleum spirit and 133 g of acetone. After nitrogen gas had been passed through the reaction solution with stirring for 45 minutes, the reactor was heated to 58° C. and 0.4 g of 2,2'-azobis(2-methylbutyronitrile) was added. Subsequently the external heating bath was heated to 75° C. and the reaction was carried out constantly at this external temperature. After 4 h and 6 h the mixture was diluted each time with 150 g of acetone/petroleum spirit mixture and 9 g of isopropanol. After a reaction time of 22 h the polymerization was terminated and the system was cooled to room temperature.

GPC measurement (test A) gave an average molecular weight $M_w$ of 250 000 g/mol.

Reference Example 3

The polymer from reference example 1 was blended with 10% by weight, based on the total weight of the PSA, of immobilized silica gel (w) obtained as elucidated beforehand.

Example 1

The polymer from reference example 1 was blended with 5% by weight of silicate fillers, based on the total weight of the PSA, having a diameter of 22 μm.

Example 2

The polymer from reference example 1 was blended with 10% by weight of silicate fillers, based on the total weight of the PSA, having a diameter of 22 μm.

Example 3

The polymer from reference example 2 was blended with 5% by weight of silicate fillers, based on the total weight of the PSA, having a diameter of 22 μm.

Example 4

The polymer from reference example 2 was blended with 10% by weight of silicate fillers, based on the total weight of the PSA, having a diameter of 22 μm.

Coating/UV Crosslinking

All samples were freed from solvent with heating (100° C.) with simultaneous reduced pressure (0.1 torr). The filled PSAs were subsequently mixed with the corresponding amount of filler in a compounder, and homogenized. The mixing temperature was 125° C. All examples were coated from the melt through a SIG die at an application rate of 50 g/m² onto siliconized release paper and onto a 23 μm PET film (from Mitsubishi) pretreated with Saran primer.

For UV curing, a UV unit from Eltosch was used. The unit is equipped with an Hg-doped UV lamp, with the wavelength range below 300 nm filtered out. The intensity of the lamp is 200 W/cm. The PSA tape specimens for crosslinking were passed through the unit at 10 m/min, with irradiation taking place in a plurality of passes (6) in order to increase the radiation dose per specimen.

After the coating and crosslinking operations, test methods B to E were conducted.

Results

The results of the technical adhesive tests and also the physical properties are summarized for reference examples 1 to 3 and for examples 1 to 4 in Table 1, which shows the advantages of the PSAs in accordance with the invention.

TABLE 1

|  | SST 10 N RT [min] Test D | UV transmission in % Test C | BS to steel in [N/cm] Test E | Residual solvent fraction in % Test B |
|---|---|---|---|---|
| Reference ex. 1 | 765 | >95 | 4.8 | <1 |
| Reference ex. 2 | 1040 | >95 | 4.5 | <1 |
| Reference ex. 3 | 15 | 24 | 3.2 | <1 |
| Example 1 | 7505 | >95 | 4.0 | <1 |
| Example 2 | +10,000 | >95 | 4.1 | <1 |
| Example 3 | 5650 | >95 | 4.4 | <1 |
| Example 4 | +10,000 | >95 | 3.7 | <1 |

SST: Shear stability time
BS: Bond strength
RT: Room temperature

Table 1 reveals that through the addition of filler the cohesion of examples 1 to 4 rises significantly in relation to reference examples 1 and 2. Reference example 3 has a very weak cohesion, since the addition of the immobilized silica gels significantly lowers the transparency and, consequently, the composition can no longer be efficiently UV-crosslinked. The residual solvent fractions, both for the reference examples and for the examples, are <1%. As a result of the increase in cohesion there is a slight decrease in the average bond strength to steel for the examples of the invention.

With the inventive examples 1 to 4 there are hotmelt systems which can be coated readily from the melt at 120° C., are highly transparent, have a low solvent fraction, and can easily be crosslinked by UV light in a wavelength range from 300 to 400 nm. Within this wavelength range the fragmentation which occurs otherwise, as a result of short wavelength ranges (254 nm, UV-C radiation), is avoided. This is a further advantage over commercial systems, such as the UV acResins™ from BASF AG, for example.

We claim:

1. A UV-transparent pressure sensitive adhesive having a UV transparency at 300 nm of more than 95%, comprising:
   (a) a copolymer of
      (a1) from 75 to 99.8% by weight of acrylic esters and/or methacrylic esters of the formula $CH_2=CH(R_1)(COOR_2)$, where $R_1$ is H or $CH_3$ and $R_2$ is an alkyl chain having 1 to 20 carbon atoms;
      (a2) from 0 to 10% by weight of acrylic acid and/or methacrylic acid of the formula $CH_2=CH(R_1)(COOH)$, where $R_1$ is H or $CH_3$;
      (a3) from 0.2 to 5% by weight of olefinically unsaturated monomers which contain at least one UV-crosslinking functional group per monomer; and
      (a4) from 0 to 20% by weight of olefinically unsaturated monomers which are different than the olefinically unsaturated monomers (a3) and which contain at least one functional group per monomer; said copolymer having a molecular weight Mw of less than 300,000 g/mol and
   (b) from 2 to 20% by weight, based on the weight of the copolymer, of a silicate filler, the silicate filler having a maximum particle diameter of 50 nm;
   the U-V-transparent pressure sensitive adhesive having a residual solvent fraction of less than 1%, based on the weight of the U-V transparent pressure sensitive adhesive.

2. A pressure sensitive adhesive as claimed in claim 1, wherein said amount of component (a1) is from 86 to 90% by weight.

3. A pressure sensitive adhesive as claimed in claim 1, wherein said amount of component (a2) is from 4 to 6% by weight.

4. A pressure sensitive adhesive as claimed in claim 1, wherein said amount of component (a3) is from 0.5 to 1.5% by weight.

5. A pressure sensitive adhesive as claimed in claim 1, wherein said amount of said silicate filler is 5 to 10% by weight.

6. A pressure sensitive adhesive as claimed in claim 1, wherein the silicate filler has a particle diameter of from 10 to 30 nm.

7. An adhesive tape comprising the pressure sensitive adhesive of claim 1.

* * * * *